(12) United States Patent
Okazaki et al.

(10) Patent No.: US 11,532,856 B2
(45) Date of Patent: Dec. 20, 2022

(54) ELECTRIC WIRE HOLDING STRUCTURE AND BUS BAR MODULE

(71) Applicant: YAZAKI CORPORATION, Tokyo (JP)

(72) Inventors: Yutaro Okazaki, Kakegawa (JP); Shinichi Yanagihara, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 303 days.

(21) Appl. No.: 16/903,394

(22) Filed: Jun. 17, 2020

(65) Prior Publication Data
US 2020/0403209 A1 Dec. 24, 2020

(30) Foreign Application Priority Data
Jun. 18, 2019 (JP) .............................. JP2019-112851

(51) Int. Cl.
*H01M 50/50* (2021.01)
*H01M 50/502* (2021.01)
*H02G 3/04* (2006.01)

(52) U.S. Cl.
CPC .......... *H01M 50/502* (2021.01); *H02G 3/045* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2,896,009 | A | 7/1959 | Caveney |
| 6,318,680 | B1 | 11/2001 | Benedict et al. |
| 2011/0064987 | A1 | 3/2011 | Ogasawara et al. |
| 2015/0221923 | A1 | 8/2015 | Ogasawara et al. |
| 2019/0109423 | A1 | 4/2019 | Shimoda et al. |

FOREIGN PATENT DOCUMENTS

| | | |
|---|---|---|
| EP | 2 892 089 A1 | 7/2015 |
| JP | H7-245839 A | 9/1995 |
| JP | 2011-65863 A | 3/2011 |
| JP | 2014-49238 A | 3/2014 |
| JP | 2017-199500 A | 11/2017 |

*Primary Examiner* — Ula C Ruddock
*Assistant Examiner* — Tony S Chuo
(74) *Attorney, Agent, or Firm* — Kenealy Vaidya LLP (57) ABSTRACT

An electric wire routing groove portion in which an electric wire is hosed includes a bottom portion; a pair of side wall portions that are erected from the bottom portion and are provided facing each other; and locking pieces that protrude from the side wall portions in directions in which the locking pieces approach each other and are formed with a gap through which the electric wire is passed between distal ends of the locking pieces. The side wall portion includes low edge portions formed on both sides of the locking pieces and provided closer to the bottom portion than a position of the locking piece on a bottom portion side.

3 Claims, 6 Drawing Sheets

ELECTRIC WIRE HOLDING STRUCTURE AND BUS BAR MODULE

CROSS-REFERENCE TO RELATED APPLICATIONS

This application is based on and claims priority under 35 USC 119 from Japanese Patent Application No. 2019-112851 filed on Jun. 18, 2019, the contents of which are incorporated herein by reference.

TECHNICAL FIELD

The present invention relates to an electric wire holding structure and a bus bar module.

BACKGROUND ART

The case of the bus bar module includes an electric wire holding structure for routing an electric wire. The electric wire is housed in an electric wire routing groove portion in the electric wire holding structure, so that a routing path is regulated. The electric wire holding structure includes a lid portion that closes an upper part of the electric wire holding structure such that the housed electric wire does not slip out.

CITATION LIST

Patent Literature

Patent Literature 1: JP-A-2011-65863

SUMMARY OF INVENTION

In the bus bar module including the electric wire holding structure, when the electric wire is routed, the electric wire is housed in the electric wire routing groove portion, and then an upper part of a housing groove portion must be covered with the lid portion. It is required to prevent the electric wire from being caught by the lid portion and to improve workability of routing the electric wire.

Therefore, an electric wire holding structure is conceivable in which locking pieces protruding in directions approaching each other are provided on upper edge parts of both side wall portions of the housing groove portion, and the electric wire is pushed into a gap between the locking pieces so as to be housed in the housing groove portion. In this electric wire holding structure, the electric wire is prevented from slipping out by the locking pieces. Accordingly, it is possible to prevent the electric wire from being caught by the lid portion or to omit the lid portion, so that it is possible to improve the workability of routing the electric wire.

However, when the electric wire is pushed into the housing groove portion, a finger hits the upper edges of the side wall portions, and the electric wire cannot be smoothly pushed into the housing groove portion through the gap between the locking pieces. Therefore, further improvement in routing workability is desired.

The present invention has been made in view of the above-described circumstances. An aspect of the present invention provides an electric wire holding structure capable of smoothly and easily housing an electric wire and excellent in routing workability and a bus bar module including the electric wire holding structure.

The above-described aspect according to the present invention is achieved by the following configurations.

(1) An electric wire holding structure including an electric wire routing groove portion in which an electric wire is housed, in which the electric wire routing groove portion includes: a bottom portion; a pair of side wall portions that are erected from the bottom portion and are provided facing each other; and locking pieces that protrude from the side wall portions in directions in which the locking pieces approach each other and are formed with a gap through which the electric wire is passed between distal ends of the locking pieces, and in which the side wall portions include low edge portions that are provided on both sides of the locking pieces and are provided closer to the bottom portion than a position of the locking piece on a bottom portion side. More specifically, the low edge portion is formed such that a length from the bottom portion to the low edge portion is smaller than a length from the bottom portion to the locking piece.

According to the electric wire holding structure having the configuration (1), the side wall portion includes the low edge portions that are provided on both sides of the locking piece and are provided closer to the bottom portion than the position of the locking piece on the bottom portion side. Therefore, when the electric wire is pushed into the gap between the pair of locking pieces with the fingers and is routed, interference of the fingers that push the electric wire with the side wall portion is prevented. Therefore, it is possible to smoothly push the electric wire into the electric wire routing groove portion through the gap between the locking pieces, and to improve the routing workability.

(2) The electric wire holding structure according to (1), in which recesses are formed on both sides of the locking pieces in the side wall portions, so that low edge portions are provided on both sides of the locking pieces.

According to the electric wire holding structure having the configuration (2), it is possible to easily provide the low edge portion on both sides of the locking piece in the side wall portion by forming the recesses on both sides of the locking piece. During the routing of the electric wire, the operator can easily view the recesses. Accordingly, it is possible to easily determine a routing position of the electric wire and to smoothly route the electric wire.

(3) The electric wire holding structure according to (2), in which a guide portion that gradually inclines toward the bottom portion and toward the locking piece is formed at an end of the recess on a side opposite to the locking piece.

According to the electric wire holding structure having the configuration (3), the fingers that push the electric wire are guided to the low edge portion by the guide portion. Accordingly, it is possible to reliably prevent the interference of the fingers with the side wall portion when the electric wire is pushed into the electric wire routing groove portion through the gap between the pair of locking pieces.

(4) The electric wire holding structure according to (1), in which slits are formed on both sides of the locking piece in the low edge portion in at least one of the side wall portions, so that a flexible arm including the locking piece at an end of the flexible arm is formed.

According to the electric wire holding structure having the configuration (4), the flexible arm is easily and elastically deformed when the electric wire is pushed through the gap between the pair of locking pieces, so that it is possible to further improve the routing workability of housing and routing the electric wire in the electric wire routing groove portion.

(5) A bus bar module including: a case that is assembled to a battery assembly including a plurality of single cells;

and a bus bar that is supported by the case and that is electrically connected and fixed to electrodes of the single cells of the battery assembly, in which the electric wire holding structure according to (1) is provided in the case.

According to the bus bar module having the configuration (5), the electric wire connected to the bus bar and the electric wire extending from the thermistor configured to detect the temperature of the single cell or the like are smoothly housed and routed in the electric wire routing groove portion provided in the case. Accordingly, it is possible to improve the routing workability of the bus bar module to be assembled to the battery assembly.

According to the present invention, it is possible to provide an electric wire holding structure capable of smoothly and easily housing an electric wire and excellent in routing workability and a bus bar module including the electric wire holding structure.

The present invention has been briefly described as above. Details of the present invention will be further clarified by reading a mode (hereinafter, referred to as an "embodiment") for carrying out the present invention described below with reference to the accompanying drawings.

DESCRIPTION OF EMBODIMENTS

Hereinafter, an embodiment according to the present invention will be described with reference to the drawings.

Figure 1:
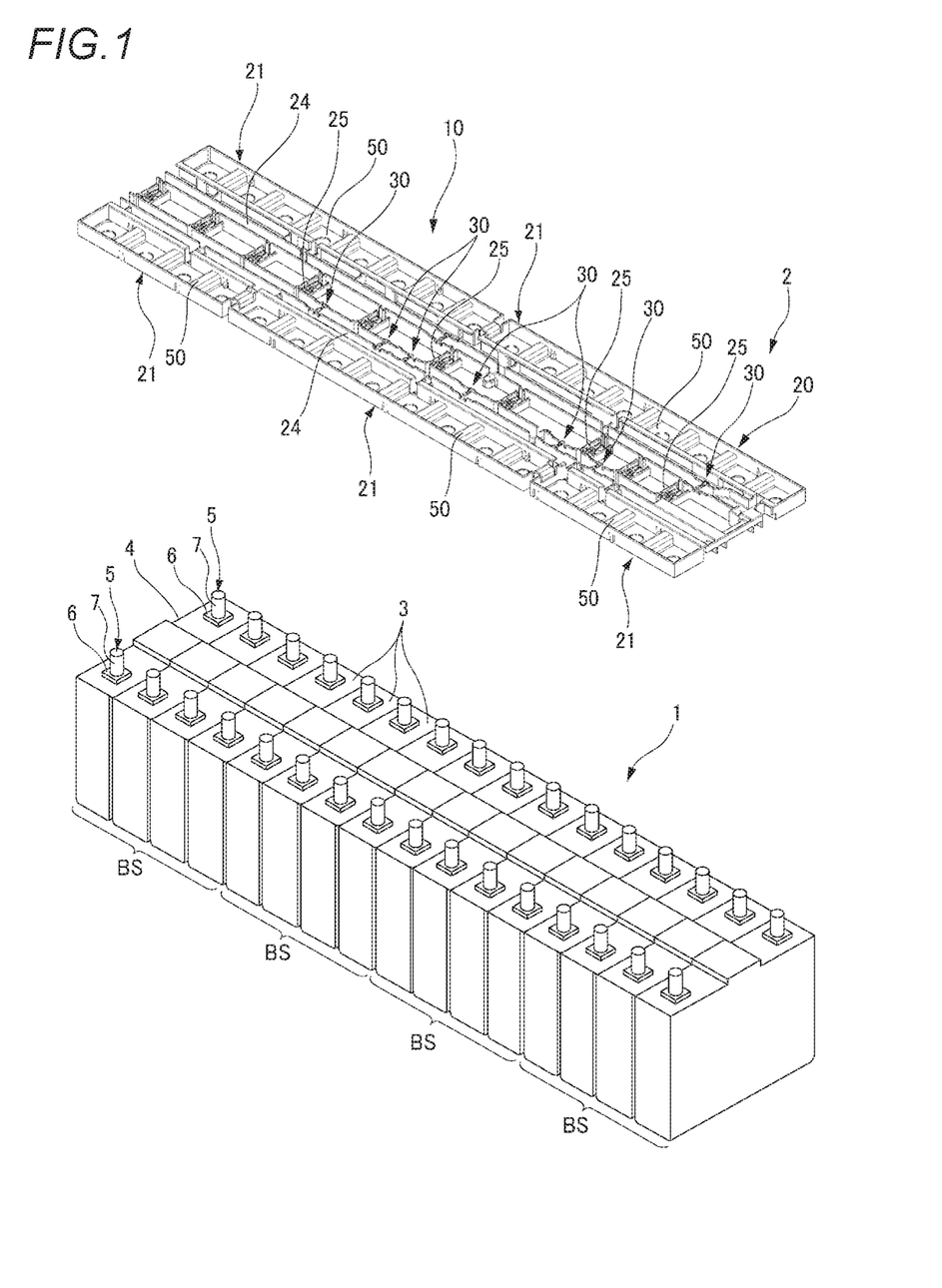
FIG. 1 is a perspective view of a bus bar module and a battery assembly according to an embodiment of the present invention.

FIG. 1 is a perspective view of a bus bar module 10 and a battery assembly 1 according to the embodiment of the present invention.

As illustrated in FIG. 1, the bus bar module 10 according to the present embodiment is assembled to an upper part of a battery assembly 1 to form a power supply device 2. The power supply device 2 is mounted and used on various vehicles which are an electric automobile that travels using an electric motor, a hybrid automobile that travels using an engine and an electric motor in combination, and the like, and is configured to supply power to the electric motor.

The battery assembly 1 includes a plurality of single cells 3 that are arranged in a row along one direction and are fixed to one another. Each single cell 3 includes a rectangular parallelepiped battery body 4, and a pair of electrodes 5 protruding from near one end of an upper surface of the battery body 4 and from near the other end of the upper surface. One of the pair of electrodes 5 is a positive electrode and the other is a negative electrode.

The single cells 3 are arranged such that the battery bodies 4 are in contact with one another. In the battery assembly 1, poles of the electrodes 5 are aligned for every four single cells 3 adjacent to one another, and one battery set BS is formed of the four single cells 3 in which the poles of the electrode 5 are aligned. In this example, the battery assembly 1 includes four battery sets BS each including four single cells 3, and the battery sets BS of the single cells 3 that are adjacent to one another are arranged such that the poles of the electrodes 5 are alternated.

Each of the pair of electrodes 5 is formed of a conductive metal. The electrode 5 includes a plate-shaped seat plate portion 6 and a columnar pole post 7 erected at a center of the seat plate portion 6. A male screw is formed on an outer periphery of the pole post 7, and a nut (not illustrated) is fastened thereto.

Figure 2:
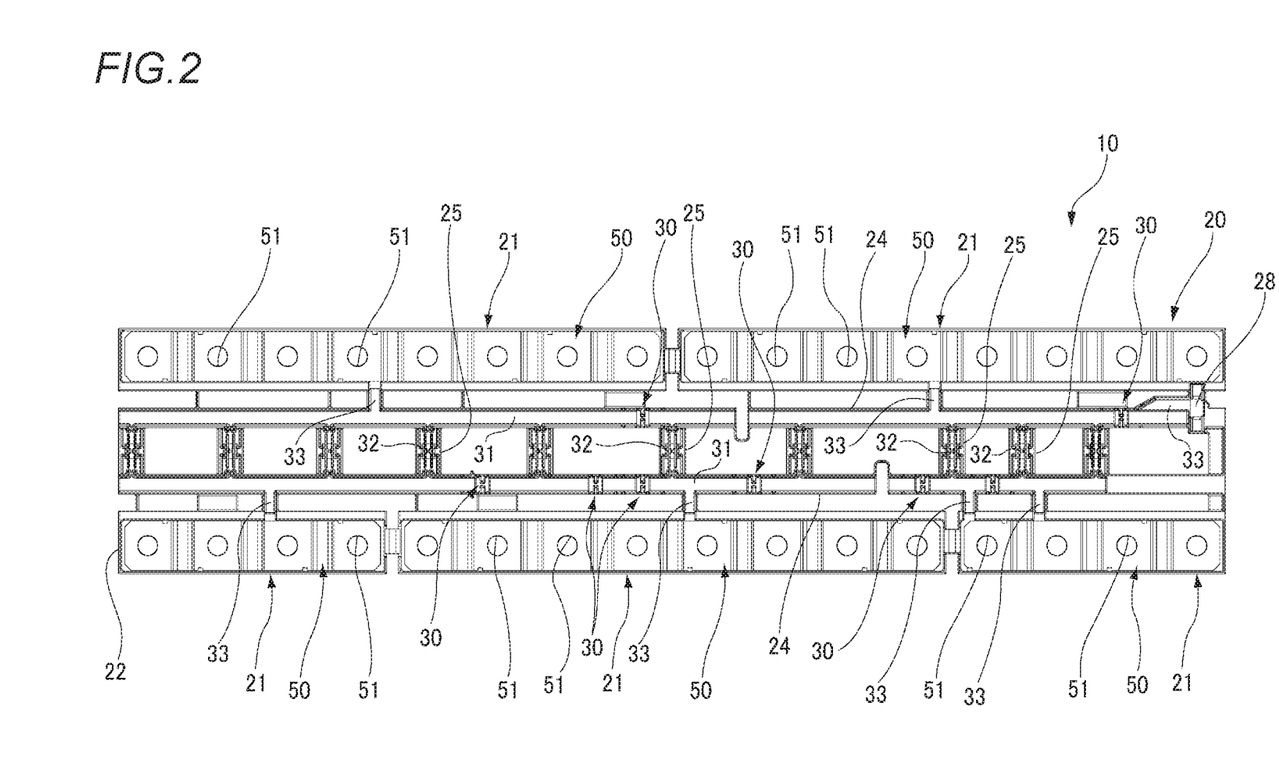
FIG. 2 is a top view of the bus bar module illustrated in FIG. 1.

FIG. 2 is a top view of the bus bar module 10 illustrated in FIG. 1.

As illustrated in FIG. 2, the bus bar module 10 includes a case 20 and a bus bar 50. The bus bar module 10 electrically connects the battery sets BS of the single cells 3 in series.

The case 20 is integrally formed of, for example, an electrically insulating synthetic resin or the like, and includes a plurality of bus bar housing portions 21.

The bus bar housing portions 21 are arranged in two rows along an arrangement direction of the plurality of single cells 3. The bus bar housing portion 21 is formed of a frame including a peripheral wall portion 22, and the bus bar 50 is housed in the bus bar housing portion 21.

The case 20 includes two support beam portions 24 along the arrangement of the bus bar housing portions 21, and the bus bar housing portions 21 are connected to and supported by the support beam portions 24, respectively. The two support beam portions 24 are connected in parallel by bridge portions 25.

One of the support beam portions 24 (on a lower side in FIG. 2) is provided with an electric wire holding structure 30 including an electric wire routing groove portion 31. The electric wire routing groove portion 31 is formed in a gutter shape with an upper side thereof opened. A thermistor mounting portion 28 is formed at an end of the other support beam portion 24 (on an upper side in FIG. 2), and a thermistor (not illustrated) configured to detect a temperature of the single cell 3 is mounted on the thermistor mounting portion 28.

The bridge portion 25 connecting the two support beam portions 24 is provided with a gutter-shaped housing groove portion 32 whose upper side is opened, and the housing groove portion 32 is provided continuously with the electric wire routing groove portion 31.

The bus bar housing portion 21 and the thermistor mounting portion 28 are provided continuously with gutter-shaped electric wire routing groove portions 33 whose upper sides are opened. The electric wire routing groove portion 33 provided continuously with the bus bar housing portion 21 in one row is provided continuously with the electric wire routing groove portion 31 of the one of support beam portions 24, and the electric wire routing groove portion 33 provided continuously with the bus bar housing portion 21 in the other row and the thermistor mounting portion 28 is provided continuously with the housing groove portion 32 of the bridge portion 25.

The electric wire routing groove portions 31, 33 and the housing groove portion 32 of the case 20 house an electric wire (not illustrated) for voltage detection electrically connected to the bus bar 50 and an electric wire (not illustrated) extending from the thermistor. These electric wires are led out from an end of the electric wire routing groove portion 31 of the one of the support beam portions 24, and are connected to a circuit board (not illustrated) including a voltage monitoring circuit and a temperature monitoring circuit.

The bus bar 50 housed in the bus bar housing portion 21 of the case 20 is formed to be long. The bus bar 50 is formed by punching and bending a conductive metal plate. The bus bar 50 is formed with a plurality of fastening holes 51 as electrical connection portions. These fastening holes 51 are formed at the same pitch as a pitch of the electrodes 5 along the arrangement direction of the single cells 3 of the battery assembly 1. The fastening hole 51 has an inner diameter slightly larger than an outer diameter of the pole post 7 of the electrode 5. The pole posts 7 of the electrodes 5 are inserted through the fastening holes 51. The nut is screwed and fastened to the pole post 7 of the electrode 5 passed through the fastening hole 51 of the bus bar 50. Accordingly, an edge of the fastening hole 51 in the bus bar 50 is fastened (fixed) while being interposed between the seat plate portion 6 of the electrode 5 and the nut, and the bus bar 50 and the electrode 5 are electrically connected and fixed.

Next, the electric wire holding structure 30 provided on the one of the support beam portions 24 of the case 20 will be described in detail.

Figure 3:
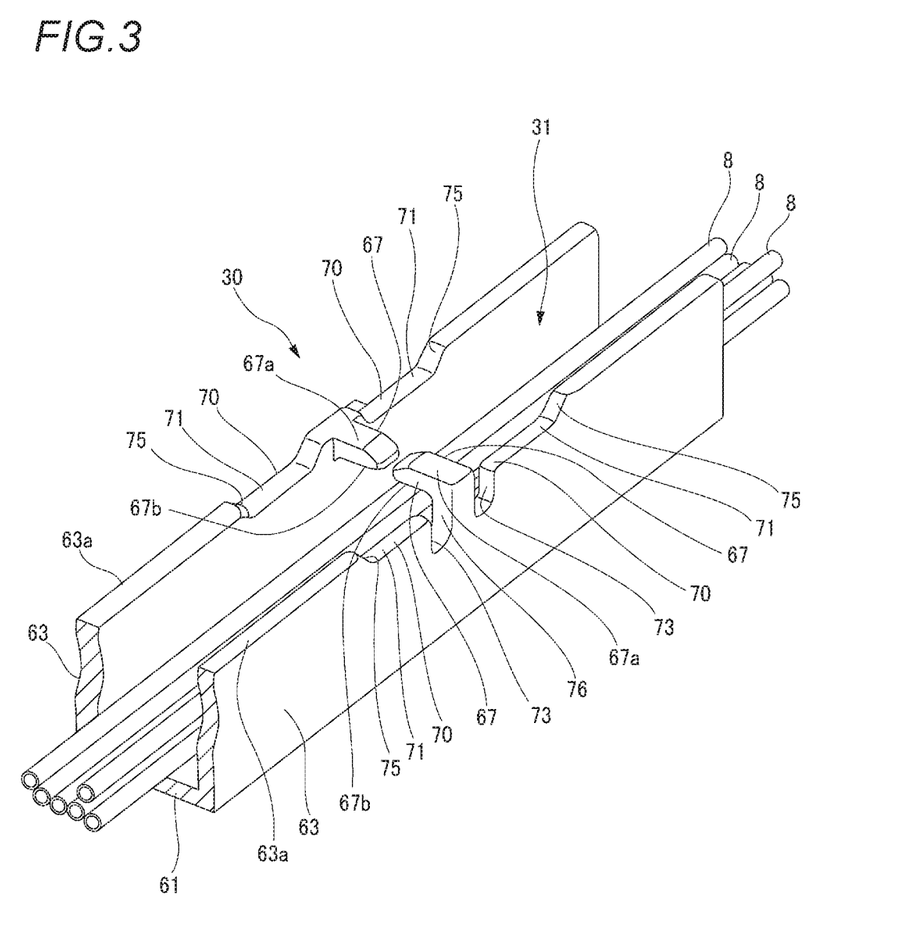
FIG. 3 is a perspective view of an electric wire routing groove portion in an electric wire holding structure provided in a case of the bus bar module illustrated in FIG. 2.
Figure 4:
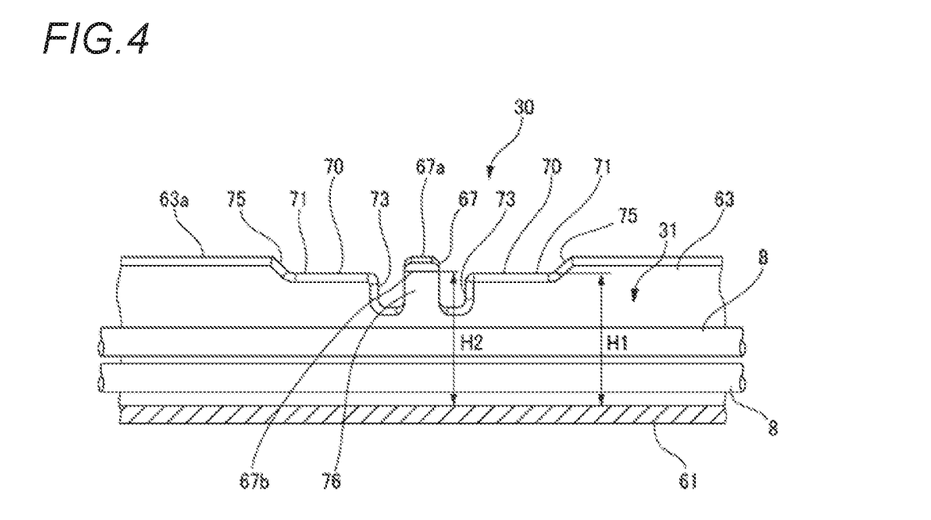
FIG. 4 is a cross-sectional view of the electric wire routing groove portion along a routing direction of an electric wire.

FIG. 3 is a perspective view of the electric wire routing groove portion 31 in the electric wire holding structure 30 provided in the case 20 of the bus bar module 10 illustrated in FIG. 2, FIG. 4 is a cross-sectional view of the electric wire routing groove portion 31 along a routing direction of an electric wire 8.

As illustrated in FIGS. 3 and 4, the electric wire routing groove portion 31 in the electric wire holding structure 30 provided on the support beam portion 24 includes a bottom portion 61 and a pair of side wall portions 63 erected from the bottom portion 61. The side wall portions 63 are formed in a plate shape, and face each other with an interval therebetween. Accordingly, the electric wire routing groove portion 31 is formed in a concave shape, and a plurality of electric wires 8 can be housed therein.

Each of the pair of side wall portions 63 of the electric wire routing groove portion 31 includes a locking piece 67. The locking pieces 67 of the side wall portions 63 protrude in directions in which the locking pieces 67 approach each other. The electric wire 8 is housed in the electric wire routing groove portion 31 through a gap between the locking pieces 67. A position of an upper surface 67a of the locking piece 67 is substantially the same as that of an upper edge 63a of the side wall portion 63.

The side wall portion 63 is formed with recesses 71 on both sides of the locking piece 67. The recesses 71 are formed by reducing a height of the upper edge 63a of the side wall portion 63. The recesses 71 are formed, so that low edge portions 70 are provided on both sides of the locking piece 67. A height H1 of the low edge portion 70 from the bottom portion 61 is lower than a height H2 of a lower surface 67b of the locking piece 67 from the bottom portion 61. That is, the low edge portions 70 on both sides of the locking piece 67 is provided closer to the bottom portion 61 than a position of the locking piece 67 on a bottom portion 61 side.

In the side wall portion 63, a guide portion 75 that gradually inclines toward the bottom portion 61 and toward the locking piece 67 is formed at an end of the recess 71 on a side opposite to the locking piece 67.

One of the side wall portions 63 includes slits 73 on both sides of the locking piece 67 in the low edge portions 70. These slits 73 are formed, so that a flexible arm 76 including the locking piece 67 at an upper end thereof extends in an upper-lower direction in the one of the side wall portions 63.

Next, a case will be described in which the electric wire 8 is routed in the electric wire routing groove portion 31.

Figure 5A:
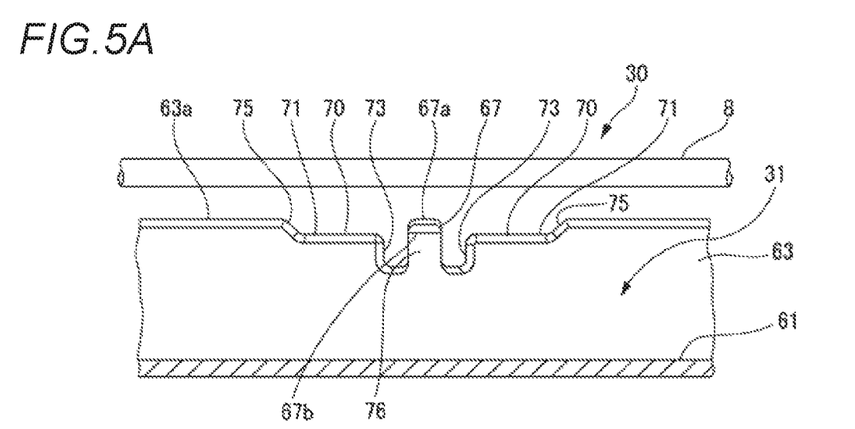
FIGS. 5A to 5C illustrate a state of housing an electric wire in the electric wire routing groove portion, and are cross-sectional views of the electric wire routing groove portion along the routing direction of the electric wire while the electric wire is being housed.
Figure 5B:
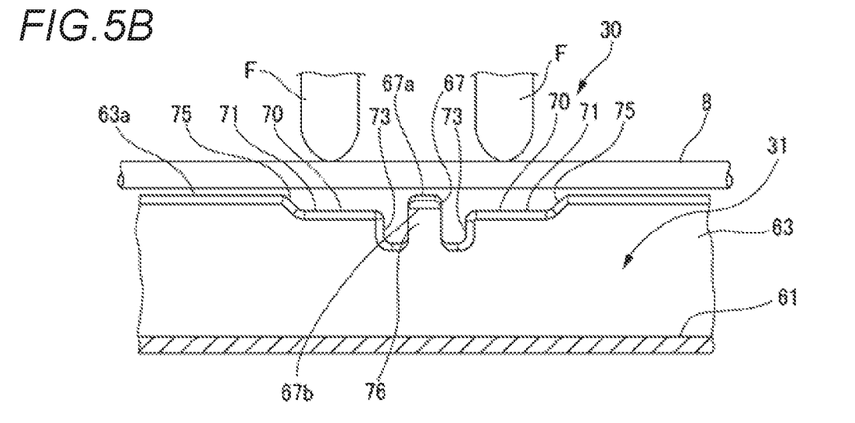
Figure 5C:
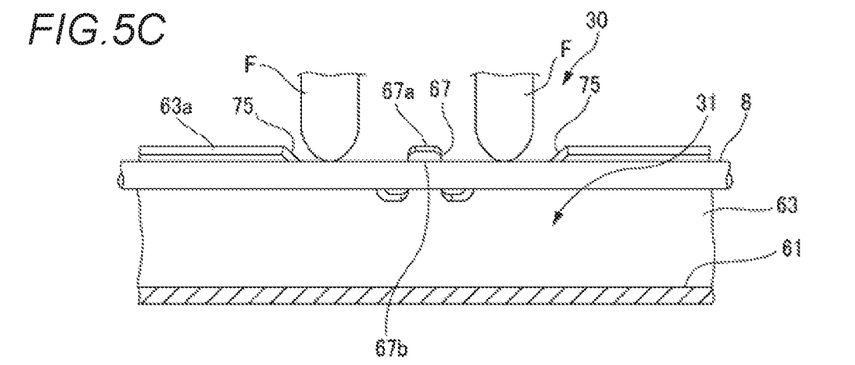

FIGS. 5A to 5C illustrate a state of housing the electric wire 8 in the electric wire routing groove portion 31, and are cross-sectional views of the electric wire routing groove portion 31 along the routing direction of the electric wire 8 while the electric wire 8 is being housed.

As illustrated in FIG. 5A, an operator holds the electric wire 8 and brings the electric wire 8 closer to the electric wire routing groove portion 31 along the routing direction with respect to the electric wire routing groove portion 31 from above. Then, the operator arranges the electric wire 8 above the electric wire routing groove portion 31.

As illustrated in FIG. 5B, the operator pushes the electric wire 8 arranged on an upper part of the locking piece 67 with fingers F toward the bottom portion 61 at two positions across the locking piece 67.

Then, as illustrated in FIG. 5C, the electric wire 8 is inserted between the positions pressed with the fingers F into the gap between the pair of locking pieces 67, and is pushed toward the bottom portion 61 side of the locking pieces 67. Accordingly, the electric wire 8 is housed in the electric wire routing groove portion 31. The electric wire 8 housed in the electric wire routing groove portion 31 is prevented from slipping out from the electric wire routing groove portion 31 by the locking pieces 67 (see FIG. 3).

Here, an electric wire holding structure 110 according to a reference example will be described.

Figure 6A:
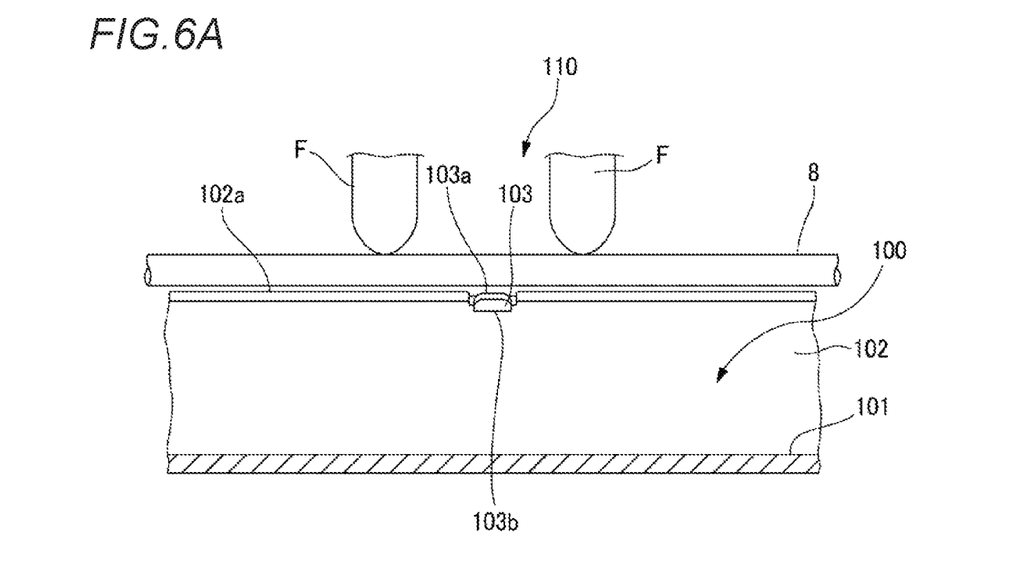
FIGS. 6A and 6B illustrate an electric wire holding structure and a state of housing the electric wire in an electric wire routing groove portion according to a reference example, and are cross-sectional views of the electric wire routing groove portion along the routing direction of the electric wire while the electric wire is being housed.
Figure 6B:
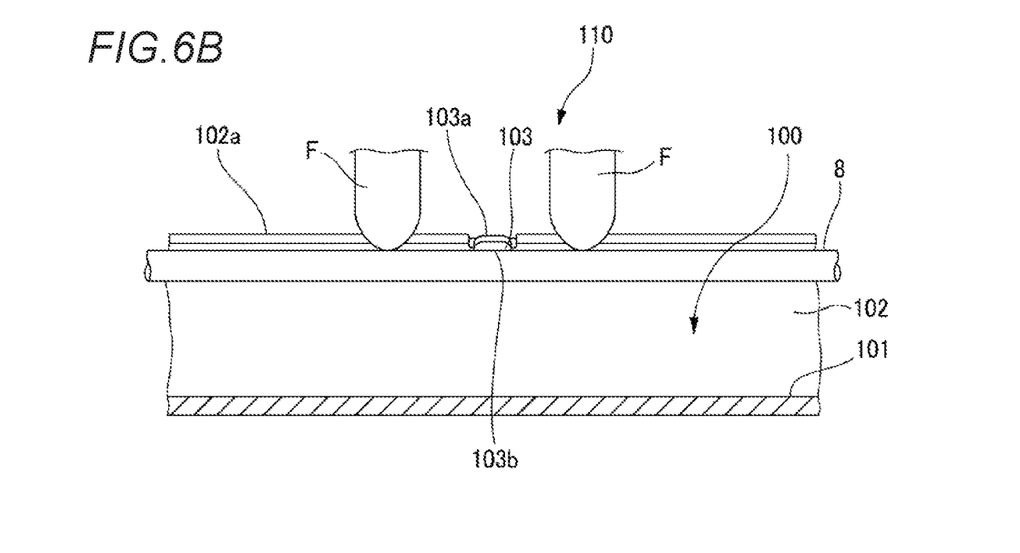

FIGS. 6A and 6B illustrate an electric wire holding structure 110 and a state of housing the electric wire 8 in an electric wire routing groove portion 100 according to the reference example, and are cross-sectional views of the electric wire routing groove portion 100 along the routing direction of the electric wire 8 while the electric wire 8 is being housed.

As illustrated in FIG. 6A, the electric wire routing groove portion 100 of the electric wire holding structure 110 according to the reference example is formed in a gutter shape including a pair of side wall portions 102 erected from a bottom portion 101. The side wall portions 102 include locking pieces 103 that are formed at upper edges 102a of the side wall portions 102 and protrude in directions in which the locking pieces 103 approach each other. An upper surface 103a of the locking piece 103 opposite to the bottom portion 101 is substantially flush with the upper edge 102a of the side wall portion 102 so as not to protrude from the upper edge 102a of the side wall portion 102. A lower surface 103b of the locking piece 103 is provided below the upper edge 102a of the side wall portion 102, that is, on a bottom portion 101 side of the upper edge 102a.

Also in a case of the electric wire routing groove portion 100 of the electric wire holding structure 110 according to the reference example, the electric wire 8 is pushed into a gap between the pair of locking pieces 103 with the fingers F from above, so that the electric wire 8 is passed through the space between the pair of locking pieces 103 and is housed in the electric wire routing groove portion 100 as illustrated in FIG. 6B.

In the electric wire holding structure 110 according to the reference example, a position of the lower surface 103b of the locking piece 103 on the bottom portion 101 side is below the upper edge 102a of the side wall portion 102, that is, on the bottom portion 101 side. Therefore, when the electric wire 8 is passed through the gap between the pair of locking pieces 103 and is housed in the electric wire routing groove portion 100, the fingers F that push the electric wire 8 hit the upper edge 102a of the side wall portion 102. Therefore, in the electric wire holding structure 110, the electric wire 8 cannot be smoothly pushed into the electric wire routing groove portion 100 through the gap between the pair of locking pieces 103, and good routing workability cannot be expected. In particular, when a groove width is small, the fingers F do not enter the electric wire routing groove portion 100. Therefore, it is difficult to route the electric wire 8.

On the other hand, according to the electric wire holding structure 30 in the present embodiment, the side wall portion 63 of the electric wire routing groove portion 31 includes the low edge portions 70 that are provided on both sides of the locking piece 67 and are provided closer to the bottom portion 61 than the position of the locking piece 67 on the bottom portion 61 side. Therefore, when the electric wire 8 is pushed into the gap between the pair of locking pieces 67 with the fingers F and is routed, interference of the fingers F that push the electric wire 8 with the side wall portion 63 is prevented. Therefore, it is possible to smoothly push the electric wire 8 into the electric wire routing groove portion 31 through the gap between the locking pieces 67, and to improve the routing workability.

According to the bus bar module 10 including the electric wire holding structure 30 in the present embodiment, the electric wire 8 connected to the bus bar 50 and the electric wire 8 extending from the thermistor configured to detect the temperature of the single cell 3 or the like are smoothly housed and routed in the electric wire routing groove portion 31 provided in the case 20. Accordingly, it is possible to improve the routing workability of the bus bar module 10 to be assembled to the battery assembly 1.

In the electric wire holding structure 30 according to the present embodiment, it is possible to easily provide the low edge portion 70 of the side wall portion 63 by forming the recesses 71 on both sides of the locking piece 67 in the side wall portion 63. During the routing of the electric wire 8, the operator can easily view the recesses 71. Accordingly, it is possible to easily determine a routing position of the electric wire 8 and to smoothly route the electric wire 8.

In the electric wire holding structure 30 according to the present embodiment, the guide portion 75 that gradually inclines toward the bottom portion 61 and toward the locking piece 67 is formed at the end of the recess 71 on the side opposite to the locking piece 67. Therefore, the fingers F that push the electric wire 8 are guided to the low edge portion 70 by the guide portion 75. Accordingly, it is possible to reliably prevent the interference of the fingers F with the side wall portion 63 when the electric wire 8 is pushed into the electric wire routing groove portion 31 through the gap between the locking pieces 67.

In the electric wire holding structure 30 according to the present embodiment, the slits 73 are formed on both sides of the locking piece 67 in the low edge portion 70 in the one side wall portion 63, so that the flexible arm 76 including the locking piece 67 at the upper end thereof is formed. Accordingly, the flexible arm 76 is easily and elastically deformed when the electric wire 8 is pushed through the gap between the pair of locking pieces 67, so that it is possible to further improve the routing workability of housing and routing the electric wire 8 in the electric wire routing groove portion 31.

The present invention is not limited to the above-described embodiment, and may be appropriately modified, improved, or the like. In addition, materials, shapes, sizes, numbers, arrangement positions, and the like of components in the above-described embodiment are optional as long as the present invention can be achieved, and the present invention is not limited thereto.

For example, the electric wire holding structure according to the present invention is not limited to the electric wire routing groove portion 31 of the support beam portion 24, and may be applied to the other electric wire routing groove portion 33. The electric wire holding structure according to the present invention is not limited to the case 20 of the bus bar module 10, but may be applied to various electric wire protection members such as a protector in which the electric wire 8 is routed.

In the above-described bus bar 50 according to the embodiment, a case has been described as an example in which the fastening holes 51 are formed as a plurality of electrical connection portions configured to electrically connect and fix the plurality of electrodes 5 of the single cells 3, and the nut is screwed to be fastened and fixed to the pole post 7 of the electrode 5 passed through the fastening hole 51. It is needless to say that the electrical connection portion of the bus bar according to the present invention is not limited thereto, and may be a welded portion that is fixed to the electrode by welding.

Here, characteristics of the electric wire holding structure and the bus bar module according to the embodiment of the present invention described above are summarized briefly in the following [1] to [5].

[1] An electric wire holding structure (30) including an electric wire routing groove portion (31) in which an electric wire (8) is housed, in which the electric wire routing groove portion (31) includes:

a bottom portion (61);
  a pair of side wall portions (63) that are erected from the bottom portion (61) and are provided facing each other; and
  locking pieces (67) that protrude from the side wall portions (63) in directions in which the locking pieces (67) approach each other and are formed with a gap through which the electric wire (8) is passed between distal ends of the locking pieces (67), and wherein the side wall portions (63) include low edge portions (70) that are provided on both sides of the locking pieces (67) and are provided closer to the bottom portion (61) than a position of the locking piece (67) on a bottom portion (61) side.

[2] The electric wire holding structure (30) according to [1], in which recesses (71) are formed on both sides of the locking pieces (67) in the side wall portions (63), so that low edge portions (70) are provided on both sides of the locking pieces (67).

[3] The electric wire holding structure (30) according to [2], in which a guide portion (75) that gradually inclines toward the bottom portion (61) and toward the locking piece (67) is formed at an end of the recess (71) on a side opposite to the locking piece (67).

[4] The electric wire holding structure (30) according to [1],
in which slits (73) are formed on both sides of the locking piece (67) in the low edge portion (70) in at least one of the side wall portions (63), so that a flexible arm (76) including the locking piece (67) at an end of the flexible arm (76) is formed.

[5] A bus bar module (10) including:
a case (20) that is assembled to a battery assembly (1) including a plurality of single cells (3); and
a bus bar (50) that is supported by the case (20) and that is electrically connected and fixed to electrodes (5) of the single cells (3) of the battery assembly (1),
in which the electric wire holding structure (30) according to [1] is provided in the case (20).

What is claimed is:

1. An electric wire holding structure comprising:
    an electric wire routing groove portion in which an electric wire is housed,
    wherein the electric wire routing groove portion includes:
        a bottom portion;
        a pair of side wall portions that are erected from the bottom portion and are provided facing each other; and
        locking pieces that protrude from the side wall portions in directions in which the locking pieces approach each other and are formed with a gap through which the electric wire is passed between distal ends of the locking pieces,
    wherein each of the side wall portions includes an upper edge and low edge portions, the low edge portions are provided on both side of the locking pieces,
    wherein the low edge portion is formed such that a length from the bottom portion to the low edge is smaller than a length from the bottom portion to the locking piece,
    wherein recesses are formed on the both sides of the locking piece in the upper edge of the side wall portion, so that the low edge portions are provided on the both sides of the locking piece,
    wherein slits are formed on the both sides of the locking piece in the low edge portion in at least one of the side wall portions, so that a flexible arm including the locking piece at an end of the flexible arm is formed, and
    wherein a respective one of the slits is located between a respective one the recesses and the locking piece of the at least one of the side wall portions.

2. The electric wire holding structure according to claim 1,
    wherein a guide portion that gradually inclines toward the bottom portion and toward the locking piece is formed at an end of the recess on a side opposite to the locking piece.

3. A bus bar module comprising:
    a case that is assembled to a battery assembly including a plurality of single cells; and
    a bus bar that is supported by the case and that is electrically connected and fixed to electrodes of the single cells of the battery assembly,
    wherein the electric wire holding structure according to claim 1 is provided in the case.

* * * * *